July 10, 1945. J. E. SHARP 2,380,194
CLOSURE FEEDING AND EMBOSSING MECHANISM
Filed April 7, 1943 2 Sheets-Sheet 1
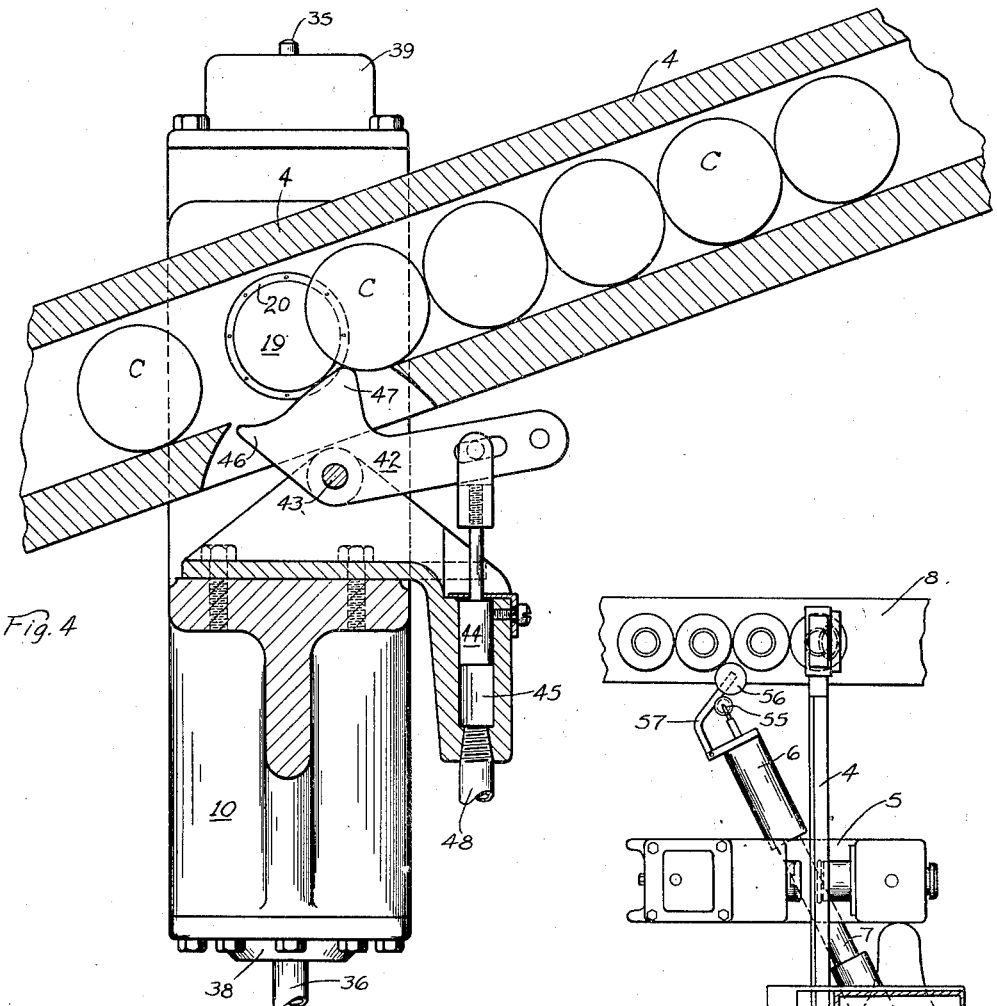
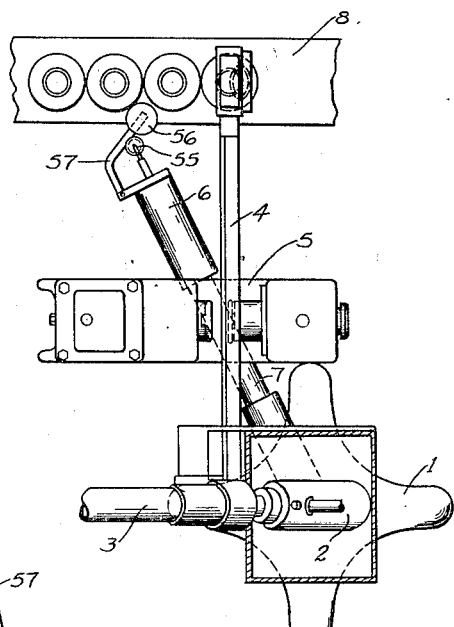
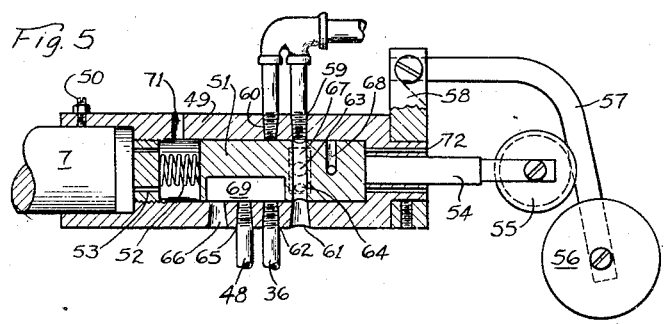
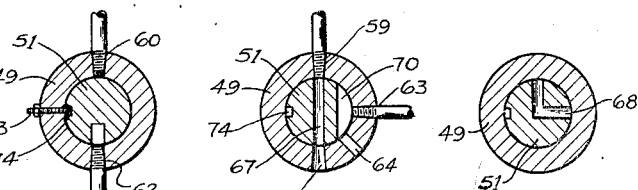
INVENTOR
John E. Sharp
BY
ATTORNEY July 10, 1945.  J. E. SHARP  2,380,194
CLOSURE FEEDING AND EMBOSSING MECHANISM
Filed April 7, 1943   2 Sheets-Sheet 2
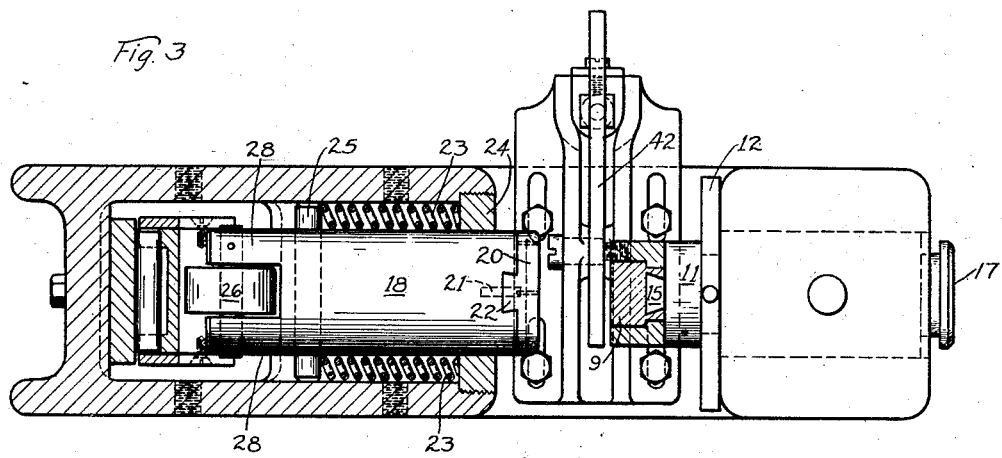
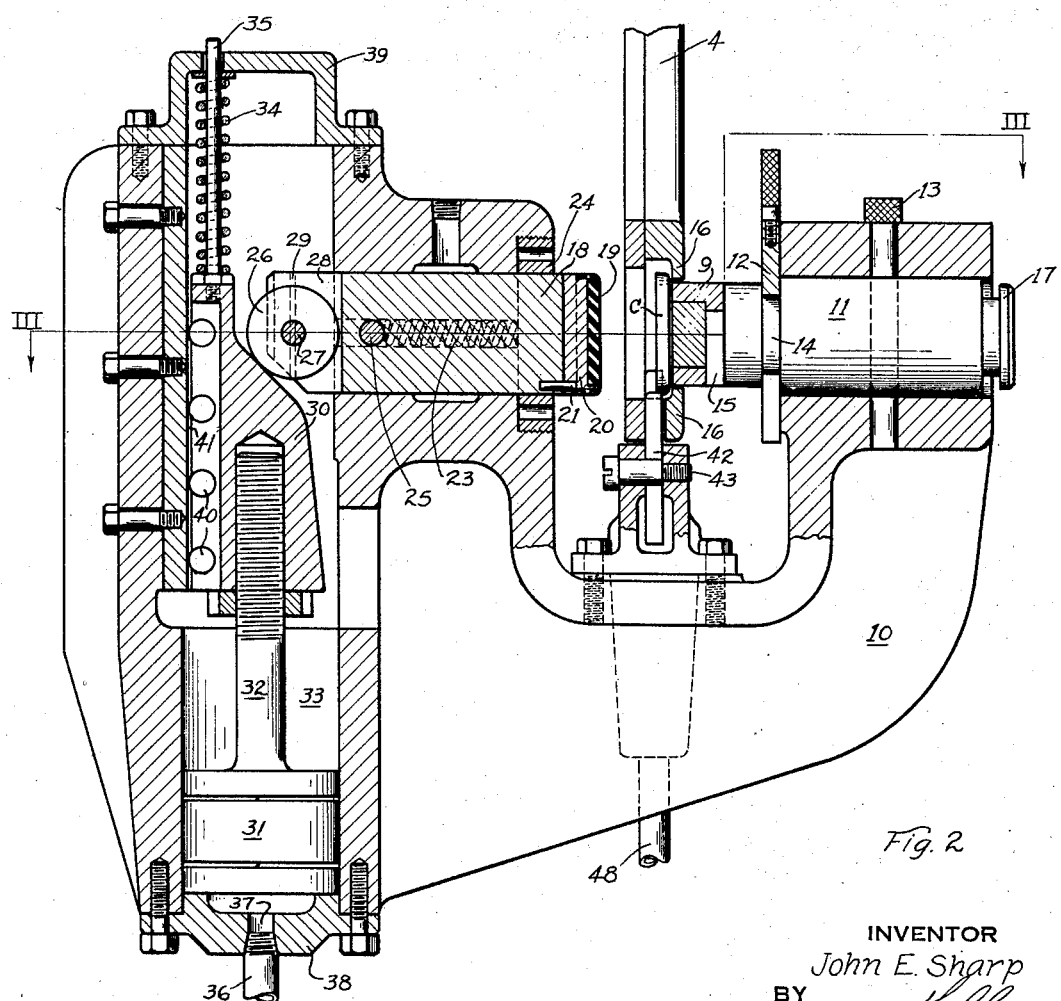
INVENTOR
John E. Sharp
BY
ATTORNEY Patented July 10, 1945

2,380,194

UNITED STATES PATENT OFFICE 2,380,194

CLOSURE FEEDING AND EMBOSSING MECHANISM

John E. Sharp, New Kensington, Pa., assignor to Aluminum Company of America, Pittsburgh, Pa., a corporation of Pennsylvania Application April 7, 1943, Serial No. 482,136

8 Claims. (Cl. 101—4)

This invention relates to an article marking apparatus and more particularly to an apparatus for printing or embossing closures for containers. The invention particularly pertains to an apparatus for embossing or printing closures in a closure feeding mechanism while the feeding mechanism is in operation.

An object of this invention is to provide an apparatus for marking, such as embossing or printing, articles in an article delivery mechanism. Another object is to provide an apparatus in association with a closure feeding mechanism for embossing or printing closures in synchronism with the feeding of closures to containers presented to the feeding mechanism. Still another object is to provide an apparatus for embossing or printing closures in comparatively small number at the place where they are to be used. Further objects and advantages will be apparent from the drawings and the following description.

Fig. 1 is a diagrammatical plan view of an embossing unit embodying the present invention and an article feeding mechanism with which it cooperates;

Fig. 2 is a vertical cross sectional view of an embossing unit;

Fig. 3 is a horizontal cross sectional view taken on line III—III of Fig. 2, with the closure feeding chute omitted;

Fig. 4 is a vertical cross sectional view of the embossing unit and a closure feeding chute taken longitudinally with the chute.

Fig. 5 is a horizontal cross sectional view of a control valve for operating in timed relation the closure feeding mechanism and embossing unit; and Figs. 6, 7, and 8 are cross sectional views of the control valve shown in Fig. 5.

The present invention is directed to an apparatus for embossing, printing or otherwise marking prefabricated closures which are being delivered through a gravity conveyor from a magazine to the mouths of containers on which the closures are to be secured. The invention is particularly adapted to marking metallic disc-shaped or cup-shaped closures by impressing identifying characters into or on a panel or other flat surface provided thereby. The embossing or printing unit which forms the subject matter of the present invention includes two character-forming members adapted to move relative to one another and diametrically disposed on either side of a conveyor in which the closures are presented for marking and thereafter delivered to the mouths of the containers. The operation of the embossing or printing unit is synchronized with the movement of containers on a conveyor to the closure feeding mechanism and, consequently, with the operation of the closure feeding mechanism.

The present invention may be readily understood by referring to the drawings in which a preferred form of the present invention is disclosed. A diagrammatic assembly of a closure feeding mechanism and embossing unit is shown in Fig. 1 wherein numeral 1 denotes a base having mounted thereon a closure picking unit 2, closure magazine 3, chute 4, embossing unit 5, control valve and arm 6 and 7. A conveyor 8 for presenting containers to the closure feeding mechanism and a row of containers thereon are shown disposed adjacent the lower end of chute 4. The embossing unit is supported by a bracket, not shown, on base 1. The closure feeding mechanism of Fig. 1 is of the type fully disclosed in the copending application Serial No. 363,621, filed October 31, 1940, now Patent No. 2,361,176, dated October 24, 1944, which is modified herein to cooperate in timed relation with the embossing unit. In this closure feeding mechanism, cup-shaped closures are withdrawn one-by-one from the magazine by suction of the closure picking unit and are discharged from this picking unit down the chute to the embossing unit and then to the exit of the chute where they are held until they are picked off by containers moving beneath the exit of the chute on the conveyor. The closure picking unit is fluid-operated. Throughout the specification and appended claims, the expression "presentation movement of the containers to the closure feeding mechanism" and expressions similar thereto refer to the movement of the containers on the conveyor past the control valve and beneath the exit of the chute to receive a closure. The closures which are suspended at the exit of the chute are removed by containers passing the exit thereof and withdrawing a closure therefrom.

In the embossing unit, shown in cross section in Figs. 2 and 3, a stationary die 9, consisting of two parts, for forming the desired characters on a closure panel is rigidly supported in frame 10 by die block 11, collar 12, and stop pin 13. Collar 12 slips into the recessed portion 14 of die block 11, and during the embossing operation prevents die block 11 from retracting under the force of the opposed embossing member. Pin 13 prevents die block 11 from moving in either direction, but the bulk of the force employed in the embossing operation falls on collar 12. The die 9 is secured to die block by an interlocking tongue and groove shown at 15. The front end of die 9 extends through side wall 16 of chute 4 so that the face of the die is flush with the inner side of wall 16. Handle 17 is provided on die block 11 to facilitate assembling of the die block and die in the frame.

Diametrically opposed to die 9 and axially aligned therewith is a reciprocable punch 18 having rubber disc 19 secured to the embossing end thereof by disc holder 20, stop pin 21, and tongue and groove 22, for pressing the characters of die 9 in the closure panel. Punch 18 is adapted to move longitudinally in frame 10 and is provided with springs 23 seated on nut 24 and bearing against pin 25, for withdrawing punch 18 and disc 19 from die 9 following an individual embossing operation. The end of punch 18 opposite disc 19 is bifurcated to hold cam follower 26 journalled on cam follower shaft 27. This shaft is supported at either end by arms 28 and is secured therein by retaining pin 29. Cam 30 on which cam follower 26 rides is provided to actuate punch 18 and disc 19 and is reciprocated by piston 31 and piston rod 32 in cylinder 33 and by coil spring 34 on guide rod 35. Fluid pressure for operating piston 31 is supplied through tube 36 and port 37 of cylinder head 38 from a fluid compressor and the control valve, the latter of which will be fully described hereinafter. Guide rod 35 which extends through cover 39 is provided to steady cam 30 during the reciprocating movement thereof. In the operation of the embossing unit, roller bearings 40, which support cam 30 against lateral pressure from punch 18, run on bearing surface 41.

In chute 4, shown best in Fig. 4, the closures, identified by the letter C, are admitted one-by-one between the embossing die 9 and punch 18 and aligned therewith by an escapement device supported by a bracket on frame 10. Lever 42 pivoted at 43 and actuated by piston 44 in cylinder 45 positions closures for the embossing operation and then releases them down chute 4 to containers for application thereto. When the arm of lever 42 is in its lowermost position, the toe at 46 retains a closure in the embossing position. With the lever in this position, the closures above the embossing unit rest on the closure being embossed. When the arm of the lever is raised by fluid pressure under piston 44, the embossed closure is released and the closures above the embossing unit are prevented from moving down the chute by the heel at 47. When the arm is again lowered, the column of closures above the embossing unit advances to place another closure in position for embossing. Fluid under pressure from a compressor and control valve is admitted into cylinder 45 under piston 44 through tube 48.

In Fig. 5, wherein the valve for controlling and synchronizing the operations of the closure feeding mechanism and the embossing unit is shown, casing 49 of the valve is secured to arm 7 by set screw 50 and is thereby rigidly supported adjacent the container conveyor. Disposed within casing 49 is piston 51 which is urged toward the forward end of the casing 49 by coil spring 52 seated on externally threaded nut 53 and the flat end of the piston. Secured to the forward end of piston 51 and adapted to move axially therewith is rod 54 which extends through the forward end of casing 49 and supports valve roller 55. Roller 56 which is so disposed relative to the conveyor as to be contacted by containers moving thereon is movably supported by lever 57 and lever support 58, the latter being rigidly secured to valve casing 49.

Referring separately to casing 49, ports 59 and 60 are provided through which fluid pressure from a compressor is admitted into the valve for distribution to the closure feeding and embossing mechanisms. Diametrically opposed to ports 59 and 60 are ports 61 and 62, respectively. Port 61 is an outlet for the compressor when no container is in a position on the conveyor to actuate the control valve. Port 62 through tube 36 communicates with cylinder 33 of the embossing unit. Midway between ports 59 and 61 on the same transverse plane, port 63 is provided to establish communication between a closure picking unit of the closure feeding mechanism and the source of fluid pressure. Adjacent port 63 on the same transverse plane is port 64 which is provided to relieve the fluid pressure in the closure picking unit when the individual closure picking operation has been completed and the piston 51 has moved to its outermost position. Port 65 through tube 48 communicates with cylinder 45 of the closure escapement device, and port 66 is an exhaust outlet for the fluid pressure of the embossing cylinder and the escapement device cylinder flowing back through ports 62 and 65.

Referring now to the details of piston 51, transverse bore 67 is provided to establish communication between ports 59 and 61 when the control valve is not being actuated by a container, and to establish communication between ports 60 and 62 when the control valve is being actuated by container contacting roller 56 and forcing piston 51 inwardly until bore 67 and ports 60 and 62 are in alignment. Bore 68, shown in Figs. 5 and 8, is provided to establish communication between port 59 from a fluid compressor and port 63 to the closure picking unit when the control valve is actuated by a container. In Figs. 5 and 8, the valve is not being actuated by a container, and consequently bore 68 is not in alignment with ports 59 and 63. Slot 69 for establishing communication between ports 62, 65 and 66 is disposed longitudinally with the axis of the piston. Transverse slot 70, shown in Fig. 7, is provided in piston 51 to establish communication between ports 63 and 64 to relieve the pressure within the closure picking unit of the closure feeding mechanism when an individual closure picking operation has been completed.

Ports 71 and 72 are provided in casing 49 at either end of the piston to maintain a constant pressure within the casing as the piston reciprocates during operation. Key 73 and slot 74, shown in Fig. 6, are provided to prevent rotation of piston 51 in the casing.

The operation of the apparatus is summarized as follows. A container advancing on conveyor 8 contacts roller 56 and through lever 57, roller 55, and rod 54, piston 51 is forced inwardly against coil spring 52 until bore 67 is in alignment with ports 60 and 62, and bore 68 is in alignment with ports 59 and 63. With the piston in this position, fluid under pressure from the compressor passes through port 60, bore 67 and port 62 and then through tube 36 to cylinder 33 under piston 31. Piston 31 advances upwardly carrying piston rod 32 and cam 30 therewith and compressing coil spring 34. Cam 30 bears against cam follower 26 causing punch 18 and rubber disc 19 to advance, and in cooperation with die 9, to emboss a closure positioned in front of die 9. Simultaneously with the operation of the embossing unit, fluid under pressure is admitted to a closure picking unit through port 59, bore 68 and port 63. As the container advances beyond roller 56, piston 51 of the control valve returns to its forward position. With the piston in this position, fluid pressure in the closure picking unit is relieved by the fluid passing back through port 63, slot 70 and exhaust port 64. The fluid under piston 31 of the embossing unit passes out of cylinder 33 back through tube 36, port 62, slot 69 and exhaust port 66, and concurrently therewith cam 30 is lowered by spring 34 and punch 18 and disc 19 are retracted from die 9 by springs 23. As the fluid is escaping through port 62, slot 69 and port 66, enough pressure builds up in slot 69 to exert pressure through port 65 and tube 48 on piston 44 of the escapement device; consequently, the fluid pressure of cylinder 33 operates piston 44 of cylinder 45. When the lever of the escapement device is raised by the fluid pressure, the embossed closure is released down chute 4 to a container. After the pressure under piston 31 of the embossing cylinder has been expelled, the pressure in slot 69 will be relieved, thus relieving the pressure under piston 44 of the escapement device. When piston 44 and the arm of lever 42 have moved down by their own weight to their original position, a new closure advances to the embossing position. This completes the cycle of the operation and the cycle will be repeated when the next container on the conveyor contacts roller 56.

It is understood that the one embodiment is shown in the drawing merely for the purpose of illustration and that the invention is not to be limited thereto.

I claim:

1. In a closure feeding mechanism having a closure chute and a closure picking unit for discharging closures thereinto, the combination of a closure marking die and punch diametrically disposed on either side of said chute, means for effecting axial relative movement between said die and punch to mark closures, an escapement device projecting into said chute for positioning closures to be marked between said die and punch and for releasing the marked closures down said chute to containers, and means controlled by the presentation movement of containers to said closure feeding mechanism for simultaneously actuating said closure picking unit and said relative movement effecting means and for thereafter actuating said escapement device to position a closure for the next succeeding marking operation.

2. In a closure feeding mechanism having a closure chute and a closure picking unit for discharging closures thereinto, the combination of a closure embossing die and punch diametrically disposed on either side of said chute, means for effecting axial relative movement between said die and punch to emboss closures, an escapement device projecting into said chute for positioning closures to be embossed between said die and punch and for releasing the embossed closures down said chute to containers, and means controlled by the presentation movement of containers to said closure feeding mechanism for simultaneously actuating said closure picking unit and said relative movement effecting means and for thereafter actuating said escapement device to position a closure for the next succeeding embossing operation.

3. In a closure feeding mechanism having a closure chute and a closure picking unit for discharging closures thereinto, the combination of a closure embossing die and punch diametrically disposed on either side of said chute, means for axially reciprocating said punch, an escapement device projecting into said chute for positioning closures to be embossed between said die and punch and for releasing embossed closures down said chute to containers, and means controlled by the presentation movement of said containers to said closure feeding mechanism for simultaneously actuating said closure picking unit and said punch reciprocating means to emboss a closure, and for thereafter actuating said escapement device to position a closure for the next succeeding embossing operation.

4. In a closure feeding mechanism having a closure chute and a closure picking unit for discharging closures thereinto, the combination of a closure embossing die and punch diametrically disposed on either side of said chute, a fluid operated means for effecting axial relative movement between said die and punch to emboss closures, a fluid operated escapement device projecting into said chute for positioning closures to be embossed between said die and punch and for releasing embossed closures down said chute to containers, and a fluid means controlled by the presentation movement of containers to said closure feeding mechanism for simultaneously actuating said closure picking unit and said relative movement effecting means and for thereafter actuating said escapement device to position a closure for the next succeeding embossing operation.

5. In a closure feeding mechanism having a closure chute and a closure picking unit for discharging closures thereinto, the combination of a closure embossing die and punch diametrically disposed on either side of said chute, fluid operated means for axially reciprocating said punch, a fluid operated escapement device for positioning closures to be embossed between said die and punch and for releasing the embossed closures down said chute to containers, and a fluid means controlled by the presentation movement of containers to said closure feeding mechanism for simultaneously actuating said closure picking unit and said punch reciprocating means to emboss a closure and for thereafter actuating said escapement device to position a closure for the next succeeding embossing operation.

6. In a closure feeding mechanism having a closure chute and a closure picking unit for discharging closures thereinto, the combination of a closure embossing die and punch diametrically disposed on either side of said chute, fluid operated means for effecting axial relative movement between said die and punch to emboss closures, a fluid operated escapement device projecting into said chute for positioning closures between said die and punch and for releasing embossed closures down said chute to containers, and a fluid means controlled by the presentation movement of containers to said closure feeding mechanism for simultaneously actuating said closure picking unit and said relative movement effecting means and for thereafter actuating said escapement device to position a closure for the next succeeding operation, said escapement device adapted to be operated by the fluid pressure dissipated from the relative movement effecting means through the control valve following an embossing operation.

7. In a closure feeding mechanism having a closure chute and a closure picking unit for discharging closures thereinto, the combination of a closure embossing die and punch diametrically disposed on either side of said chute, fluid operated means for axially reciprocating said punch, a fluid operated escapement device for positioning closures to be embossed between said die and punch and for releasing the embossed closures down said chute to containers, and a fluid means controlled by the presentation movement of containers to said closure feeding mechanism for simultaneously actuating said closure picking unit and said punch reciprocating means to emboss a closure and for thereafter actuating said escapement device to position a closure for the next succeeding embossing operation, said escapement device adapted to be operated by the fluid pressure dissipated from the punch reciprocating means through the control valve following an embossing operation.

8. In a closure feeding mechanism having a closure chute and a closure picking unit for discharging closures thereinto, the combination of a closure embossing die and punch diametrically disposed on either side of said chute, a cylinder and piston and a cam operated thereby for axially reciprocating said punch, a fluid operated escapement device for positioning closures to be embossed between said die and punch and for releasing the embossed closures down said chute to containers, a fluid means controlled by the presentation movement of containers to said closure feeding mechanism for simultaneously actuating said closure picking unit and said punch to emboss a closure and for thereafter actuating said escapement device to position a closure for the next succeeding embossing operation, said escapement device adapted to be operated by the fluid pressure dissipated from said cylinder through the control valve following an embossing operation.

JOHN E. SHARP.